US010755273B2

(12) United States Patent
Groarke et al.

(10) Patent No.: US 10,755,273 B2
(45) Date of Patent: Aug. 25, 2020

(54) SYSTEMS AND METHODS FOR MAPPING NON-VALIDATED DATA WITH VALIDATED DATA

(71) Applicant: MasterCard International Incorporated, Purchase, NY (US)

(72) Inventors: Peter J. Groarke, Dublin (IE); Ionut Nistor, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 533 days.

(21) Appl. No.: 15/216,925

(22) Filed: Jul. 22, 2016

(65) Prior Publication Data

US 2018/0025354 A1   Jan. 25, 2018

(51) Int. Cl.
*G06Q 20/40* (2012.01)
*G06Q 20/38* (2012.01)

(52) U.S. Cl.
CPC .......... *G06Q 20/40* (2013.01); *G06Q 20/382* (2013.01); *G06Q 20/4016* (2013.01)

(58) Field of Classification Search
None
See application file for complete search history.

(56) References Cited

U.S. PATENT DOCUMENTS

| | | | |
|---|---|---|---|
| 8,635,117 B1 | 1/2014 | Acuna-Rohter | |
| 10,304,056 B1* | 5/2019 | Izenson | G06Q 20/322 |
| 2011/0022628 A1 | 1/2011 | Kramer et al. | |
| 2011/0137928 A1* | 6/2011 | Engle | G06Q 40/123 |
| | | | 707/769 |
| 2011/0153461 A1 | 6/2011 | Royyuru | |
| 2015/0012435 A1 | 1/2015 | Ramavarjula et al. | |

(Continued)

FOREIGN PATENT DOCUMENTS

EP    1732034 A1 *  6/2005  ............. G06Q 10/00

OTHER PUBLICATIONS

PCT International Search Report and Written Opinion, Application No. PCT/US2017/043014, dated Sep. 18, 2017, 12 pgs.

*Primary Examiner* — Alexander G Kalinowski
*Assistant Examiner* — Blane A Lickteig
(74) *Attorney, Agent, or Firm* — Armstrong Teasdale LLP

(57) ABSTRACT

A data mapping (DM) computing device including a processor and a memory in communication with the processor is provided. The processor receives a plurality of validated data messages associated with a plurality of transactions through a first communication channel and receives a non-validated data message associated with a first transaction through a second communication channel. Each validated data message includes a plurality of validated data elements with a validated merchant identifier. The non-validated data message includes a plurality of non-validated data elements with a non-validated merchant identifier. The processor further compares the validated data messages and the non-validated data message, identifies a validated data message that is associated with the first transaction based on the comparison, maps the non-validated merchant identifier and the validated merchant identifier of the identified validated message, and stores the mapped merchant identifiers in a linked identifier table within the memory.

15 Claims, 7 Drawing Sheets

(56) References Cited

U.S. PATENT DOCUMENTS

2015/0356690 A1* 12/2015 Celikyilmaz .......... G06Q 40/12
　　　　　　　　　　　　　　　　　　　705/30
2016/0034991 A1　 2/2016 Howe
2016/0260100 A1* 9/2016 Wiesman ........... G06Q 20/4016
2017/0178246 A1* 6/2017 Farrell .................. G06Q 40/12

* cited by examiner

SYSTEMS AND METHODS FOR MAPPING NON-VALIDATED DATA WITH VALIDATED DATA

BACKGROUND

The field of the present disclosure relates generally to mapping non-validated data to validated data, and more particularly, linking non-validated merchant identifiers to validated merchant identifiers from authorization messages.

At least some known payment processing systems receive data from a plurality of data sources, such as merchants, banks, cardholders, and other parties associated with the payment processing system. Some of these data sources are considered validated data sources. That is, data from the validated data sources is considered to be accurate and is provided in a standard format. Other data sources are considered non-validated sources and provide a variety of information to the payment processing system. However, the data from the non-validated sources is not automatically considered to be accurate and may not necessarily be in the standard format. If the data is not in the standard format for the particular data or data field, the payment processing system may not be able to use the non-validated data.

In one example, when payment card transactions are initiated, one or more authorization messages are generated to request authorization for the transactions. The authorization messages include a plurality of data fields or parameters that provide information about an associated transaction. For example, the authorization messages may include information associated with the transaction, such as a transaction amount, a date and time, a primary account number (PAN), an acquirer identifier, a merchant identifier (e.g., name and/or address of the merchant), and a transaction currency code. The authorization messages are transmitted to a payment processor so that the authorization messages can be processed by an authorization system to either authorize or decline the transactions. The data included in the authorization messages are typically considered to be accurate information associated with the transactions (i.e., validated data) and therefore merchants and the like may use the authorization messages to analyze transaction data. In addition, the authorization messages may be used to inject information into the authorization system to influence an outcome of an authorization process (accept or decline).

Merchants may submit data such as a confidence score to influence the authorization process. The data from the merchants is typically considered to be non-validated data that may be submitted in different formats. For example, the merchant may provide a merchant identifier for a transaction that does not exactly match the merchant identifier of an authorization message for the same transaction. In such cases, the authorization system may not include the merchant-submitted data with the authorization message during the authorization process.

BRIEF DESCRIPTION

In one aspect, a data mapping (DM) computing device including a processor and a memory in communication with the processor is provided. The processor receives a plurality of validated data messages associated with a plurality of transactions through a first communication channel and receives a non-validated data message associated with a first transaction through a second communication channel. Each validated data message includes a plurality of validated data elements with a validated merchant identifier. The non-validated data message includes a plurality of non-validated data elements with a non-validated merchant identifier. The processor further compares the validated data messages and the non-validated data message, identifies a validated data message that is associated with the first transaction based on the comparison, maps the non-validated merchant identifier and the validated merchant identifier of the identified validated message, and stores the mapped merchant identifiers in a linked identifier table within the memory.

In another aspect, a method for linking non-validated data to validated data is provided. The method is at least partially performed by a DM computing device. The method includes receiving a plurality of validated data messages associated with a plurality of transactions through a first communication channel and receiving a non-validated data message associated with a first transaction through a second communication channel. Each validated data message includes a plurality of validated data elements with a validated merchant identifier. The non-validated data message includes a plurality of non-validated data elements with a non-validated merchant identifier. The method further includes comparing the validated data messages and the non-validated data message, identifying a validated data message that is associated with the first transaction based on the comparison, mapping the non-validated merchant identifier and the validated merchant identifier of the identified validated message, and storing the mapped merchant identifiers in a linked identifier table.

In yet another aspect, at least one non-transitory computer-readable storage media for linking non-validated data to validated data is provided. The computer-readable storage media has computer-executable instructions embodied thereon. When executed by at least one processor, the computer-executable instructions cause the processor to receive a plurality of validated data messages associated with a plurality of transactions through a first communication channel and receive a non-validated data message associated with a first transaction through a second communication channel. Each validated data message includes a plurality of validated data elements with a validated merchant identifier. The non-validated data message includes a plurality of non-validated data elements with a non-validated merchant identifier. The computer-executable instructions further cause the processor to compare the plurality of validated data messages and the non-validated data message, identify a validated data message that is associated with the first transaction based on the comparison, map the non-validated merchant identifier and the validated merchant identifier of the identified validated message, and store the mapped merchant identifiers in a linked identifier table within the memory.

BRIEF DESCRIPTION OF THE DRAWINGS

FIG. 1 is a schematic diagram illustrating an example multi-party payment processing system used to map validated authorization content to non-validated merchant identifiers.

FIG. 2 is a block diagram of an example identifier mapping system for use with the system shown in FIG. 1.

FIG. 3 is an example data flow diagram of the system shown in FIG. 2.

FIG. 4 is an expanded block diagram of an example embodiment of a remote device for use in the system shown in FIG. 2.

FIG. 5 illustrates an example configuration of a host system for use in the system shown in FIG. 2.

FIG. 6 is a flowchart of an example process for linking merchant identifiers to authorization content using the system shown in FIG. 2.

FIG. 7 is a diagram of components of one or more example computing devices that may be used in embodiments of the described systems and methods.

DETAILED DESCRIPTION

Figure 1:
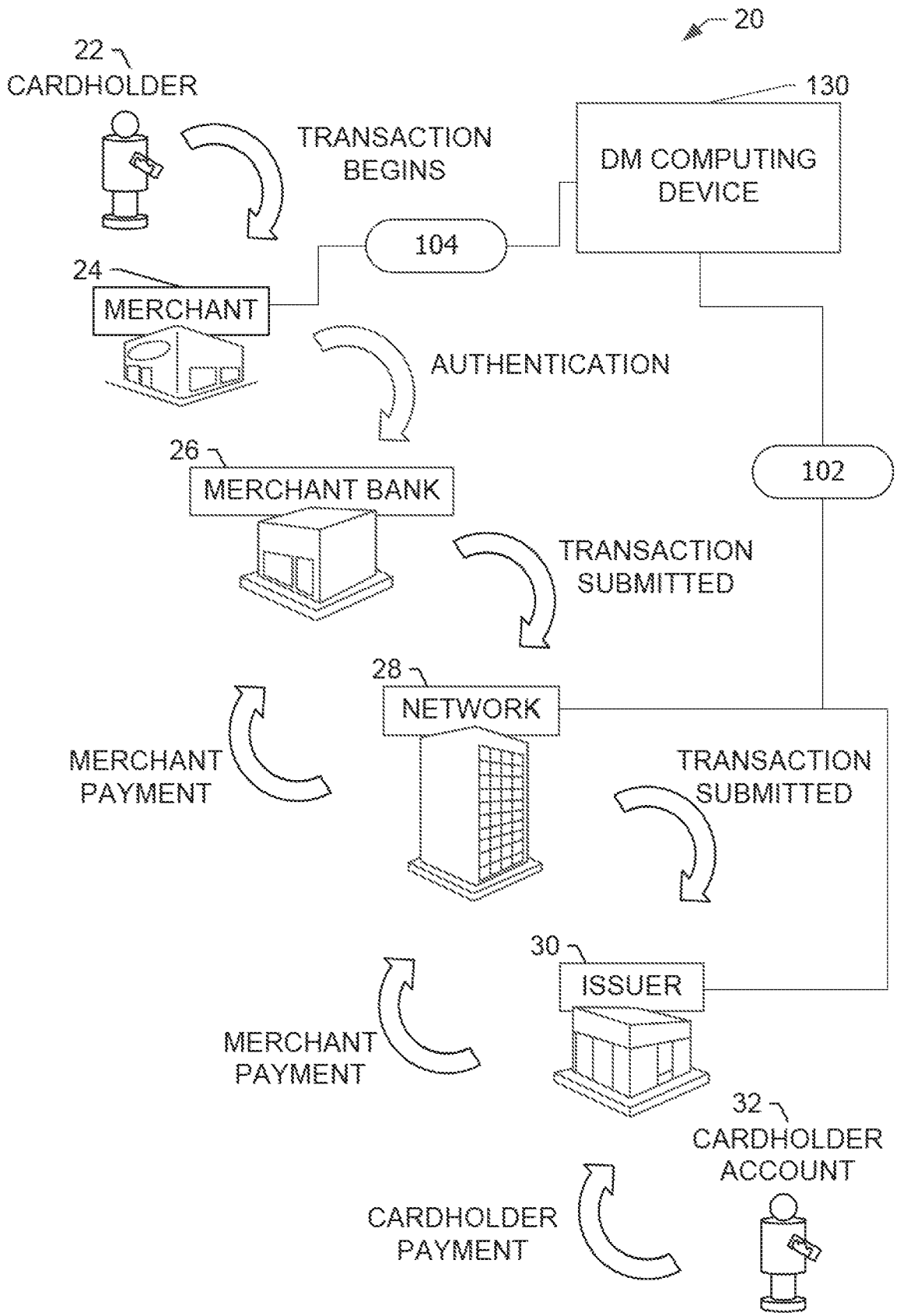
FIGS. 1-7 show example embodiments of the methods and systems described herein.

The following systems and methods described herein relate generally to linking validated data to non-validated data, and more specifically, to dynamically mapping validated data associated with a transaction to non-validated data associated with the same transaction.

"Card-not-present" (CNP) transactions generally have a higher decline rate than "card-present" transactions due to a higher risk of fraud. Unlike card-present transactions, merchants are unable to physically inspect the payment card during a CNP transaction to verify the purchaser is actually the cardholder. The authorization system may have fraud protection rules that are applied to each pending transaction to determine if the transaction is potentially fraudulent. Some legitimate CNP transactions may be identified as potentially fraudulent and declined even though the cardholder is initiating the transactions. To assist cardholders, online merchants may provide a confidence score on behalf of the cardholders to the authorization system that indicates the online merchant's confidence that the transaction is not fraudulent. The confidence score message is typically sent independent (i.e., over a separate network) from the transaction data and must be matched to a corresponding authorization message. This matching is performed by the payment processor. However, some merchants may not include sufficient information in the confidence score message to definitively match (i.e., the confidence score message matches only one authorization message) to the corresponding authorization message. In this example, the merchant may only store a partial PAN for each transaction. Some partial PANs may correspond to multiple authorization messages. The payment processor may also compare merchant identifiers to definitively match the confidence score message to an authorization message. However, the merchant may provide a different merchant identifier than the authorization message (e.g., "XYZ Co." rather than "XYZ Company"). As a result, the confidence score message may not be matched to a corresponding authorization message.

In another example, a cardholder may request a report of transactions made by the cardholder over the past year. The report includes a plurality of data fields for each transaction. One data field includes a merchant identifier of a merchant associated with the transaction. The merchant identifier may be pre-populated by the cardholder or a merchant. The report may use data from a plurality of authorization messages to verify the report and/or provide additional information about each transaction. To populate the report with data from a plurality of authorization messages, the authorization messages are compared to the data fields for each transaction to identify a corresponding entry in the report. However, similar to the above example with confidence scores, the report may not include sufficient or valid information to definitively match each entry to an authorization message. In particular, the merchant identifiers in the report may be different than the merchant identifiers of the authorization messages.

The system described herein is an identifier mapping system for mapping validated authorization content to non-validated merchant identifiers. More specifically, the system retrieves and/or receives authorization content (e.g., authorization messages) and merchant identifiers from user content (e.g., messages transmitted by a merchant) for one or more transactions and links the authorization content and merchant identifiers together for subsequent transactions. The system described herein includes a payment processor, a user device, a data mapping (DM) computing device, and a database. The DM computing device is in communication with the payment processor, the user device, and the database. In one embodiment, the DM computing device is part of the payment processor or integral with the payment processor. In another embodiment, the DM computing device is separate from the payment processor. In such an embodiment, the DM computing device is communicatively coupled to the payment processor.

Transaction data associated with one or more transactions is sent to the payment processor for processing. The payment processor may be configured to generate or receive authorization messages, such as ISO® 8583 compliant messages and ISO® 20022 compliant messages, for each transaction of the transaction data. As used herein, "ISO®" refers to a series of standards approved by the International Organization for Standardization. (ISO is a registered trademark of the International Organization for Standardization of Geneva, Switzerland.) ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

The payment processor transmits the authorization messages to the DM computing device over a first communication channel. In other embodiments, an issuer device associated with an issuing party (e.g., a bank) may transmit the authorization messages over the first communication channel. The authorization messages include validated data elements, including a merchant identifier. That is, the authorization messages include data elements that are assumed to be correct. In the example embodiment, the validated merchant identifier is the merchant's "doing business as" (DBA) name. The DBA name is the merchant's legal name or title. Although the merchant identifier is the DBA name in this embodiment, it is to be understood that the merchant identifier may be different, such as a different name or identifier of the merchant. In addition, the authorization message includes additional validated data elements associated with a respective transaction, such as transaction amount, cardholder information, a time stamp of the transaction, and other data associated with the merchant. In some implementations, the payment processor is configured to authorize transactions. In other implementations, the payment processor transmits the authorization messages to another computing device configured to authorize transactions.

In the example embodiment, the user device is a computing device of a merchant, cardholder, issuer, and the like that submits merchant identifiers to the DM computing device over a second communication channel. In the example embodiment, the first communication channel is different from the second communication channel. For example, the first communication channel may be from payment processing network while the second communication channel may be a web call to the DM computing device. In other embodiments, the first and second communication channels may be the same communication channels. The first and second communication channels may be configured to process and transmit data at different speeds, intervals, or locations. For example, the authorization messages may be received from the payment processor within seconds of the associated transactions being initiated, while the non-validated data from a merchant may be transmitted every twenty minutes to the DM computing device.

The user device is configured to transmit non-validated data associated with one or more transactions to the DM computing device to facilitate mapping the non-validated data with the validated data elements of the authorization messages as described herein. The non-validated data is considered non-validated because the data is generally sent to the DM computing device from outside of the payment processing network. Since the non-validated data can be received from various user devices with different formatting, identifiers, and so forth, unlike the validated data from the first communication channel, the data is considered non-validated until the DM computing device verifies the accuracy and authenticity of the data.

In the example embodiment, the non-validated data includes a non-validated merchant identifier for each transaction. The merchant identifiers may be included in user messages transmitted to the DM computing device. The user messages are used to inject additional information with the authorization messages during an authorization process or to facilitate retrieval of matching authorization messages. As used herein, matching an authorization message to a user message means the authorization and user messages are associated with the same transaction. The authorization message and the user message may not be identical or include identical data elements.

The user message may include, for example, a confidence score message. The confidence score message includes a confidence score associated with a transaction that, when included with the authorization message, may influence an outcome of the authorization process. The user message also includes a plurality of non-validated data elements such as a non-validated merchant identifier. In one embodiment, the non-validated data elements include at least a transaction amount, a date and time of the transaction, a PAN, and a merchant identifier. The PAN may be a full PAN (e.g., 16 digits) or a partial PAN, such as the first six digits or the last four digits of the PAN. The merchant identifier may be a name, address, and/or another unique identifier of the merchant. In this example, although the merchant identifier may be the DBA name of a merchant, the merchant identifier may also be a different name associated with the merchant. For example, "Generic Company Ltd." may be the DBA name of the merchant, but the user message may include "Generic Company" instead.

The DM computing device is configured to dynamically map non-validated data to validated data from authorization content to facilitate verifying subsequent non-validated data for use with the authorization content. In the example embodiment, the DM computing device is in communication with a database that stores a linked identifier table with one or more entries. Alternatively, the linked identifier table may be stored in a different memory associated with the DM computing device. Each entry of the linked identifier table includes one or more mapped merchant identifiers that are associated with the same merchant. In this example, each entry includes the validated DBA name of the merchant and other previously non-validated names of the merchant that were included in one or more user messages. The linked identifier table enables the DM computing device to replace non-validated merchant identifiers in the user messages with mapped merchant identifiers from the linked identifier table and/or identify matching authorization messages based on the mapped merchant identifier. In one example, the linked identifier table is dynamically generated and updated based on non-validated and validated data processed by the DM computing device.

To create the linked identifier table, the DM computing device is configured to receive the non-validated from the user device and the validated from the payment processor. In the example embodiment, each of the non-validated and validated data includes a merchant identifier. The DM computing device is further configured to compare the non-validated data elements from the non-validated data to the validated data elements of the validated data to identify validated data that definitively matches the non-validated data. That is, the DM computing device compares data elements of the validated and non-validated data to identify validated data associated with the same transaction as the non-validated data. In the example embodiment, the DM computing device compares at least the PAN, transaction amount, date and time of the transaction, and the merchant identifier of the non-validated data to the corresponding data elements of the validated data. If non-validated data elements associated with a transaction substantially match the validated data elements associated with the same transaction, the DM computing device may determine that the validated data definitively matches the non-validated data. In some cases, the non-validated data may not include sufficient or valid information to match validated data associated with only one transaction.

In one example, a non-validated user message is received at the DM computing device and includes a partial PAN, a transaction amount, a date and time of the transaction, and a merchant identifier. In this example, the merchant identifier is not the DBA name of the merchant. If the transaction occurred during business hours on a weekday, the user message may match with a plurality of authorization messages that include the partial PAN and therefore cannot be definitively matched to one authorization message. However, for user messages with atypical or unique data elements, the user message may be definitively matched to one authorization message. For example, a user message associated with a transaction occurring at 3:05 AM on a Tuesday may be definitively matched to an authorization message even without a full PAN or other data elements because only one authorization message includes the limited data elements of the user message.

Once a definitive match is found, the DM computing device is configured to link or map the merchant identifier of the user message to the merchant identifier of the identified authorization message. In particular, the DM computing device stores both merchant identifiers in the linked identifier table together as an entry. The mapped merchant identifiers may be stored as a new entry in the linked identifier table or as an update to an existing entry.

For subsequent user messages and authorization messages received at the DM computing device, the DM computing device is configured to compare the merchant identifier of the user messages and/or the authorization messages to the linked merchant table. If an entry of the linked merchant table includes a mapped merchant identifier that matches the merchant identifier of the user message and/or the authorization message, the DM computing device may retrieve one or more mapped merchant identifiers of the entry to be used to definitively match the user message and the authorization message. The DM computing device may be further configured to notify the payment processor, the user device, and/or a different computing device of the matching user and authorization messages to facilitate additional processing and analysis. In some implementations, the DM computing device may be configured to modify the user message or the authorization message to include the mapped merchant identifiers. The user message and/or the authorization message may be transmitted to the payment processor and/or the user device. Here, the transaction may be processed and enter a transaction lifecycle including authorization, clearing, and settlement processes.

However, if the merchant identifiers of the user messages and the authorization messages do not match any mapped merchant identifiers in the linked identifier table, the DM computing device compares the user and authorization messages to identify any definitive matches. If a definitive match is found and the merchant identifiers of the matching user and authorization message are different, the DM computing device links the merchant identifiers and stores the merchant identifiers in the linked identifier table. As a result, the linked identifier table is dynamically and automatically developed over time to enable the system to increase the number of matching user and authorization messages without manual intervention.

In one example, a cardholder makes a purchase through an online merchant. The cardholder has made several purchases in the past with the online merchant. Based at least in part on the cardholder's purchase history with the online merchant, the online merchant generates a confidence score to be submitted to an authorization system "on-behalf-of" the cardholder to influence the outcome of an authorization process. When the transaction is being processed, the online merchant transmits the confidence score as part of a confidence score message to a DM computing device. In this example, the confidence score message includes a partial PAN, a transaction amount, a date and time, and a merchant identifier associated with the transaction. The merchant identifier is not the DBA name of the online merchant. Instead, the merchant identifier is a different name of the online merchant as perceived by the online merchant.

The DM computing device receives the confidence score message and an authorization message associated with the transaction. Since the confidence score message was received from a merchant, the confidence score is considered to be non-validated. In contrast, the authorization message is received from a payment network and therefore is considered to be validated. The authorization message includes the DBA name of the online merchant as a merchant identifier. However, the DM computing device may not have sufficient information from the confidence score message to definitively match the confidence score message to the authorization message and validate the confidence score message. The data elements of the confidence score message may match multiple authorization messages. In this example, the DM computing device compares the validated merchant identifier of the authorization message to a linked identifier table and retrieves any corresponding mapped merchant identifiers stored in the linked identifier table. Alternatively, the DM computing device may compare the confidence score message with the linked identifier table. The DM computing device then compares the confidence score message and/or the authorization message with the corresponding mapped merchant identifiers to identify a definitive match between the confidence score message and the authorization message. If a definitive match is made, the DM computing device may transmit the confidence score message to the authorization system to include the confidence score during authorization of the transaction.

The methods and systems described herein may be implemented using computer programming or engineering techniques including computer software, firmware, hardware or any combination or subset thereof, wherein the technical effects may be achieved by performing one of the following steps: (i) receiving a user message including a merchant identifier and associated with a first transaction; (ii) receiving a plurality of authorization messages, each authorization message including a merchant identifier and is associated with a transaction; (iii) comparing the user message and the plurality of authorization messages; (iv) identifying an authorization message of the plurality of authorization messages that is associated with the first transaction based on the comparison; (v) linking the merchant identifier of the user message and the merchant identifier of the identified authorization message; and (vi) storing the linked merchant identifiers in a linked identifier table.

The systems and methods described herein are configured to facilitate (a) improved matching of non-validated data with validated data; (b) automated mapping of merchant identifiers; and (c) improved matching for non-validated data including partial data.

Described herein are computer systems such as a payment processor, a user device, and a data mapping computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticate remote purchases via a user device.

FIG. 1 is a schematic diagram illustrating an example multi-party payment card system 20 for enabling device to device authentication in online payment card transactions. The present disclosure relates to payment card system 20, such as a credit card payment system using the MasterCard® payment card system payment network 28 (also referred to as an "interchange" or "interchange network"). Master-Card® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

For online transactions, an authentication process may also be performed to verify that cardholder 22 is physically present when making an online purchase with cardholder's account 32. In the embodiments described herein, a data mapping (DM) computing device 130 operated by merchant 24, payment network 28, issuer 30, and/or another third-party facilitates automatically linking merchant identifiers from user-submitted content and authorization content for transactions processed using payment card system 20. DM computing device 130 is communicatively coupled to payment network 28, and issuer 30 through a first communication channel 102 and merchant 24 through a second communication channel 104 to link and provide mapped merchant identifiers during payment processing and an authorization process for transactions, as described herein.

Figure 2:
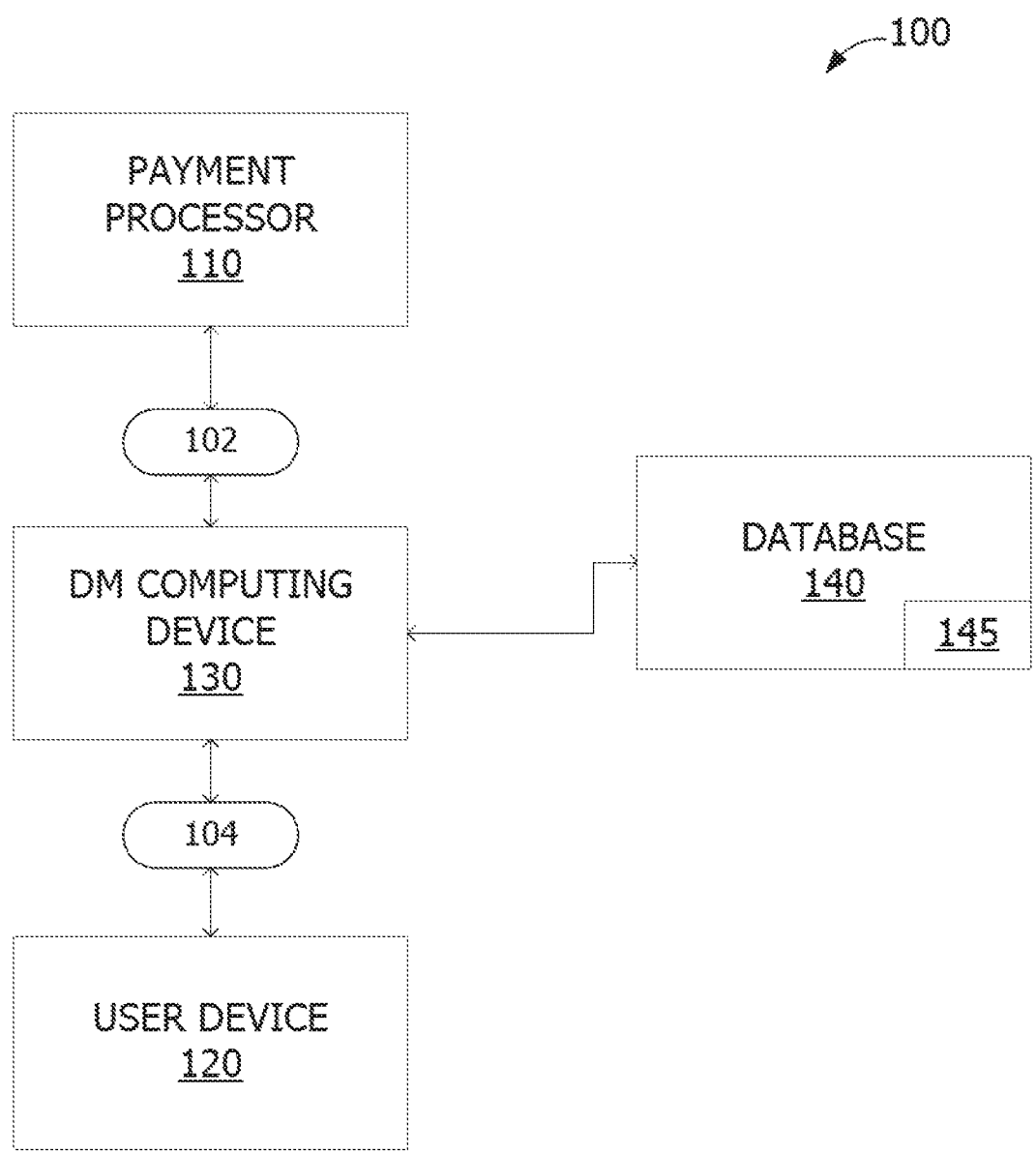

FIG. 2 is a diagram illustrating an example of an identifier mapping system 100. System 100 includes a payment processor 110, a user device 120, DM computing device 130, and a database 140. DM computing device 130 is in communication with payment processor 110, user device 120, and database 140. In other embodiments, system 100 may include additional, fewer, or alternative computing devices, including those described elsewhere herein.

Payment processor 110 is associated with payment network 28 (shown in FIG. 1). Transaction data associated with one or more transactions is sent to payment processor 110 for processing. In some embodiments, during processing, payment processor 110 is configured to generate authorization messages for each transaction of the transaction data. The authorization messages are configured to provide information about a respective transaction for use in an authorization process of the transaction. The authorization messages may also include information associated with the cardholder, merchant, and other parties associated with the purchase. In the example embodiment, each authorization message includes at least one merchant identifier. In at least some embodiments, the merchant identifier is the merchant's "doing business as" (DBA) name. The DBA name is the merchant's legal name or title. Although the merchant identifier is the DBA name in this embodiment, it is to be understood that the merchant identifier may be different, such as a different name or identifier of the merchant. In addition, the authorization message includes additional information associated with a respective transaction, such as transaction amount, cardholder information, a time stamp of the transaction, and other data associated with the merchant.

In the example embodiment, the authorization process is implemented by issuer 30 (shown in FIG. 1). In other embodiments, payment processor 110 is configured to provide the authorization process. During the authorization process, an authorization message and additional information associated with a transaction, merchant, and/or cardholder is collected to determine whether or not to authorize the transaction. To pair the additional information with the authorization message, the authorization message and the additional information have to share one or more identifiers that definitively match the additional information to the authorization message. That is, the additional information only matches to a single authorization message. In the example embodiment, the additional information is user information as described herein. Payment processor 110 is configured to transmit the authorization messages to DM computing device 130. The authorization messages are considered validated data. Although the authorization messages and the data elements of the authorization messages are described herein, it is to be understood that DM computing device 130 is configured to receive other validated data and data elements and provide similar functions described below.

In the example embodiment, user device 120 is a computing device of a merchant, cardholder, issuer, and the like that collects, receives, generates, and/or otherwise stores information associated with one or more transactions. In particular, user device 120 is configured to transmit merchant identifiers associated with transactions to DM computing device 130. In other embodiments, user device 120 may transmit non-validated merchant identifiers to payment processor 110. Payment processor 110 may forward or transfer the non-validated merchant identifiers to DM computing device 130 for analysis as described herein.

The non-validated merchant identifiers may be names, addresses, and/or other unique identifiers of the merchants. In the example embodiment, although the non-validated merchant identifiers may be the DBA name of a merchant, the non-validated identifiers may also be a different name associated with the merchant. For example, "Generic Company Ltd." may be the DBA name of the merchant, but the user message may include "Generic Company" instead. The non-validated merchant identifiers may be included in non-validated data, such as user messages, transmitted to DM computing device 130. The non-validated data configured to include information with the authorization messages or to facilitate identifying and retrieving authorization messages that match the user messages. As used herein, matching an authorization message to the non-validated data means the authorization message and the non-validated data are associated with the same transaction. The authorization message and the non-validated data may not be identical or include identical information. Although described herein as a "user message," DM computing device 130 is configured to receive different forms or types of non-validated data and provided similar functions as those described below.

The user messages may be, for example, a confidence score message. The confidence score message includes a confidence score that, when included with the authorization message, may influence an outcome of the authorization process. For example, the confidence score message may be submitted by a merchant associated with a purchase indicating, based on the cardholder's historical purchases with the merchant, the merchant's confidence that the authentic cardholder is initiating the purchase. The user message also includes a plurality of data elements including the merchant identifier. In one embodiment, the user message includes at least a transaction amount, a date and time of the transaction, a PAN, and a merchant identifier. At least some user messages include a data element with partial data, such as a partial PAN (e.g., the first six digits or the last four digits of the PAN). The partial data may be associated with multiple transactions. For instance, a partial PAN may be associated with multiple payment accounts that have made similar purchases. In one example, user device 120 may not be configured to collect, generate, or otherwise receive more than the partial data. In another example, user device 120 may store the partial data to prevent fraudulent activity.

DM computing device 130 is configured to dynamically map merchant identifiers of user messages to merchant identifiers of authorization messages to facilitate identifying matching user messages and authorization messages. In the example embodiment, DM computing device 130 is communicatively coupled to database 140. In some embodiments, DM computing device 130 may include database 140. Database 140 is configured to store a linked identifier table 145 with one or more entries. Alternatively, linked identifier table 145 may be stored in a different memory associated with DM computing device 130. Each entry of linked identifier table 145 includes one or more merchant identifiers that are associated with the same merchant. In this example, each entry includes the DBA name of the merchant and other names of the merchant that were included in one or more previous user messages. Table 1 includes example entries of linked identifier table 145. Linked identifier table 145 enables DM computing device 130 to replace merchant identifiers in the user messages with mapped merchant identifiers from linked identifier table 145 and/or identify matching authorization messages based on the mapped merchant identifiers. In one example, linked identifier table 145 is dynamically generated and updated based on user messages and authorization messages processed by DM computing device 130.

TABLE 1

| DBA Merchant Names | Mapped Merchant Identifiers |
| --- | --- |
| Generic Company Ltd. | Gen. Co., Generic Company, Generic Co. Ltd |
| Widget R Us International | Widget R Us, WidgetRUs, Widget R Us USA |
| ABC Corporation | ABC Corp. |

To create and update linked identifier table 145, DM computing device 130 is configured to receive the non-validated user messages from user device 120 and the validated authorization messages from payment processor 110. In the example embodiment, each of the user messages and the authorization messages include a merchant identifier. DM computing device 130 is further configured to compare the non-validated data elements from the user messages to the validated data elements of the authorization messages to identify an authorization message that definitively matches a user message. In the example embodiment, DM computing device 130 compares at least the PAN, transaction amount, date and time of the transaction, and the merchant identifier of the user messages to the corresponding data elements of the authorization messages. If data elements from one of the user messages substantially match the data elements of only one authorization message, DM computing device 130 may determine that the authorization message definitively matches the user message.

In some cases, the user message may not include sufficient or valid information to match with only one authorization message. In particular, if the user message includes a data element with partial data (e.g., a partial PAN), a set of authorization messages may be associated with the partial data. DM computing device 130 is configured to determine, based on the set of authorization messages associated with the partial data and the other data elements of the user message, whether or not a single authorization message of the set of authorization messages definitively matches the user message. More specifically, DM computing device 130 compares the data elements of the user message to the data elements of each authorization message of the set of authorization messages. If only one authorization message has data elements that match or are substantially similar to the data elements of the user message, then the authorization message is identified as a definitive match.

In one example, a user message is received at DM computing device 130 and includes a partial PAN, a transaction amount, a date and time of the transaction, and a merchant identifier. In this example, the merchant identifier is not the DBA name of the merchant. If the transaction occurred during business hours on a weekday, the user message may match with a plurality of authorization messages that include the partial PAN and therefore cannot be definitively matched to one authorization message. However, for user messages with atypical or unique data elements, the user message may be definitively matched to one authorization message. For example, a user message associated with a transaction occurring at 3:05 AM on a Tuesday may be definitively matched to an authorization message even without a full PAN or other data elements because only one authorization message includes the limited data elements of the user message.

Once a definitive match is found, DM computing device 130 is configured to link or map the non-validated merchant identifier of the user message to the validated merchant identifier of the identified authorization message. In particular, DM computing device 130 stores both merchant identifiers in linked identifier table 145 together as an entry. The mapped merchant identifiers may be stored as a new entry in linked identifier table 145 or as an update to an existing entry (e.g., "Gen. Co." is added to "Generic Company Ltd.", shown in Table 1).

For subsequent user messages and authorization messages received at DM computing device 130, DM computing device 130 is configured to compare the merchant identifiers of the user messages and/or the authorization messages to linked merchant table 145. In some embodiments, payment processor 110 and/or user device 120 may transmit an identifier query including a merchant identifier to DM computing device 130 instead of the authorization and user messages. If an entry of linked merchant table 145 includes a mapped merchant identifier that matches the merchant identifier of the user message and/or the authorization message, DM computing device 130 may retrieve one or more mapped merchant identifiers of the entry for definitively matching a user message to an authorization message. DM computing device 130 may be further configured to notify payment processor 110, user device 120, and/or a different computing device of the matching user and authorization messages to facilitate additional processing and analysis. In some implementations, DM computing device 130 may be configured to modify the user message or the authorization message to include the mapped merchant identifiers. At least a portion of the matching user message and/or the matching authorization message may be transmitted to payment processor 110 and/or user device 120. Here, the transaction may be processed and enter a transaction lifecycle including authorization, clearing, and settlement processes.

However, if the merchant identifier of the user messages and the authorization messages do not match any stored merchant identifiers in linked identifier table 145, DM computing device 130 compares the user and authorization messages to identify any definitive matches. If a definitive match is found and the merchant identifiers of the matching user and authorization messages are different, DM computing device 130 links the merchant identifiers and stores the merchant identifiers in linked identifier table 145. As a result, linked identifier table 145 is dynamically and automatically developed over time to enable the system to increase the number of matching user and authorization messages without manual intervention.

Figure 3:
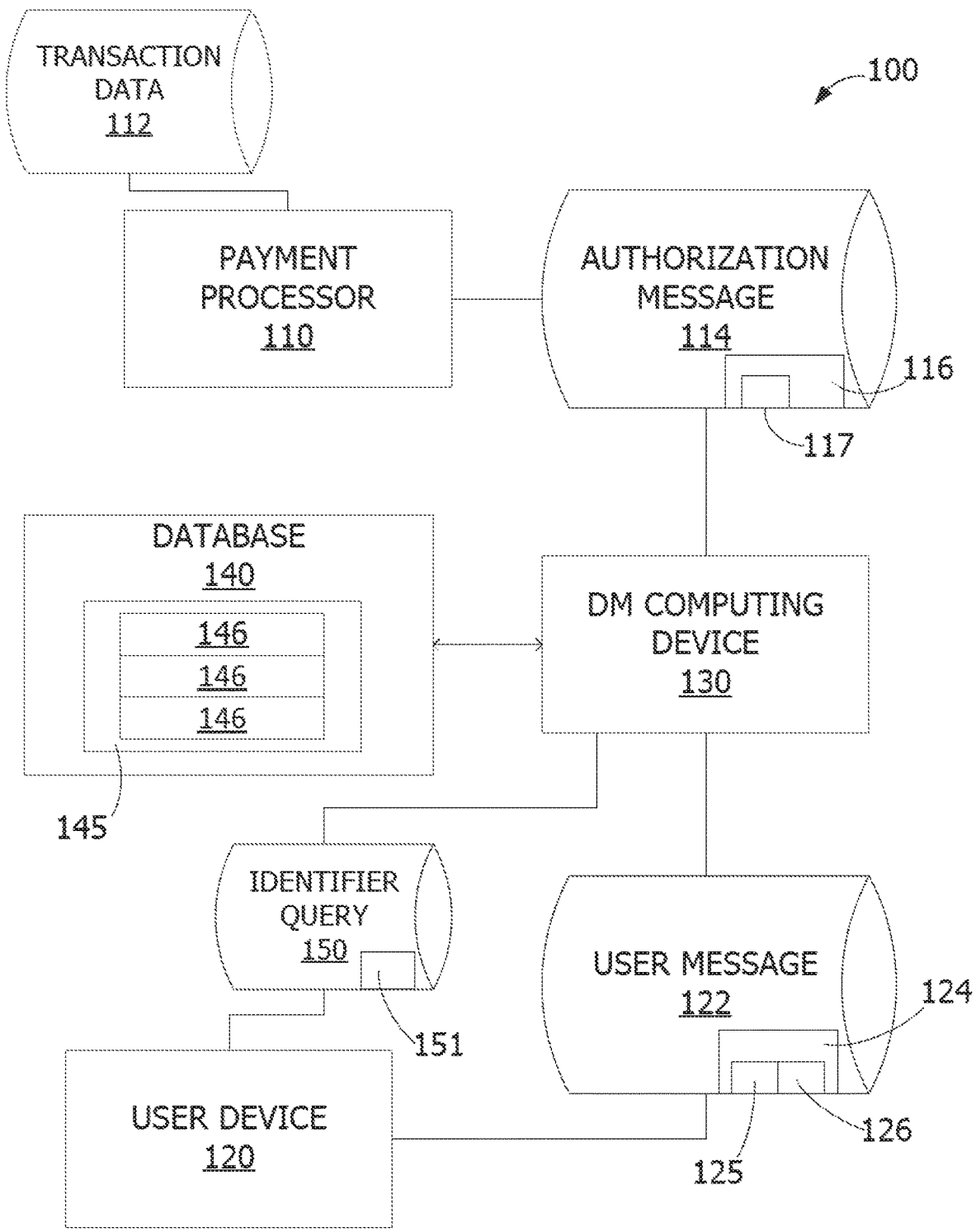

FIG. 3 is an example data flow diagram of system 100 (shown in FIG. 2). In particular, FIG. 3 depicts data flow between payment processor 110, user device 120, DM computing device 130, and database 140 (all shown in FIG. 2). In other embodiments, system 100 may provide additional, fewer, or alternative data, including those described elsewhere herein.

With reference to FIGS. 2 and 3, in the example embodiment, payment processor 110 receives transaction data 112 for one or more transactions. For each transaction of transaction data 112, payment processor 110 receives and/or generates an authorization message 114 that includes a plurality of validated authorization data elements 116. Authorization data elements 116 include a validated merchant identifier 117. Authorization message 114 is transmitted to DM computing device 130 for analysis. User device 120 is configured to generate user messages 122 for one or more transactions associated with user device 120. In the example embodiment, user message 122 includes a plurality of non-validated user data elements 124. User data elements 124 include an non-validated merchant identifier 125 and a partial data element 126. User message 122 is transmitted to DM computing device 130.

DM computing device 130 is configured to compare user data elements 124 of user message 122 to authorization data elements 116 of at least some authorization messages 114 received from payment processor 110. Based on the comparison, if a definitive match between user message 122 and one authorization message 114, DM computing device 130 is configured to generate a new entry 146 (or update an existing entry 146 that matches the messages) in linked identifier table 145 that includes merchant identifiers 117 and 125. DM computing device 130 is configured to provide mapped merchant identifiers 117 and/or 125 to payment processor 110 or user device 120 in response to receiving an authorization message or user message that includes a merchant identifier that matches either merchant identifier 117, merchant identifier 125, or another mapped merchant identifier of entry 146. In some embodiments, DM computing device 130 may receive an identifier query 150 including a merchant identifier 151 from payment processor 110 and/or user device 120 for subsequent transactions to compare to linked identifier table 145.

Figure 4:
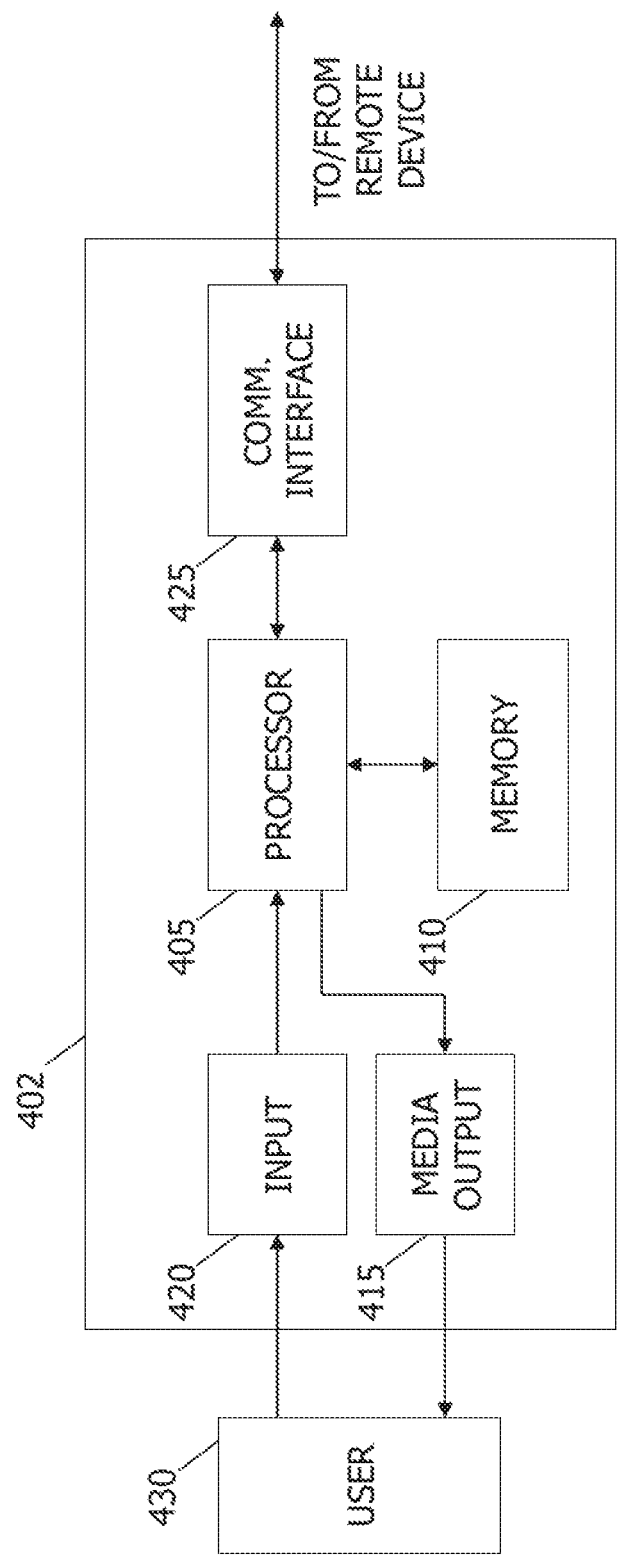

FIG. 4 depicts an exemplary configuration of a remote or user computing device 402, such as user device 120 and DM device 130. Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 430. Media output component 415 may be any component capable of conveying information to user 430. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 430.

In some embodiments, computing device 402 may include an input device 420 for receiving input from user 430. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device such as user device 120 (shown in FIG. 2). Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business.

Figure 5:
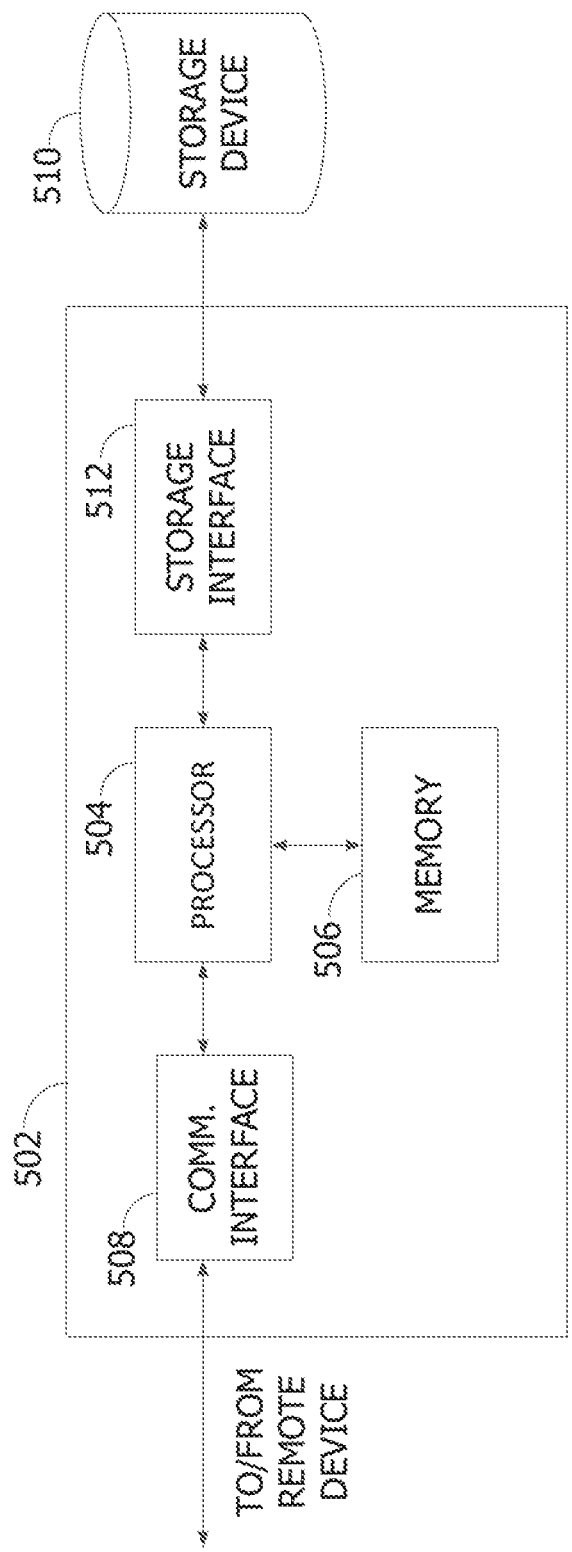

FIG. 5 depicts an exemplary configuration of a host computing device 502, such as payment processor 110 and DM computing device 130 (shown in FIG. 2). Host computing device 502 may include a processor 505 for executing instructions. Instructions may be stored in a memory area 506, for example. Processor 504 may include one or more processing units (e.g., in a multi-core configuration).

Processor 504 may be operatively coupled to a communication interface 508 such that host computing device 502 may be capable of communicating with a remote device such as computing device 302 shown in FIG. 3 or another host computing device 502. For example, communication interface 508 may receive requests from user computing device 302 via the Internet.

Processor 504 may also be operatively coupled to a storage device 510. Storage device 510 may be any computer-operated hardware suitable for storing and/or retrieving data. In some embodiments, storage device 510 may be integrated in host computing device 502. For example, host computing device 502 may include one or more hard disk drives as storage device 510. In other embodiments, storage device 510 may be external to host computing device 502 and may be accessed by a plurality of host computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 may be operatively coupled to storage device 510 via a storage interface 512. Storage interface 512 may be any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
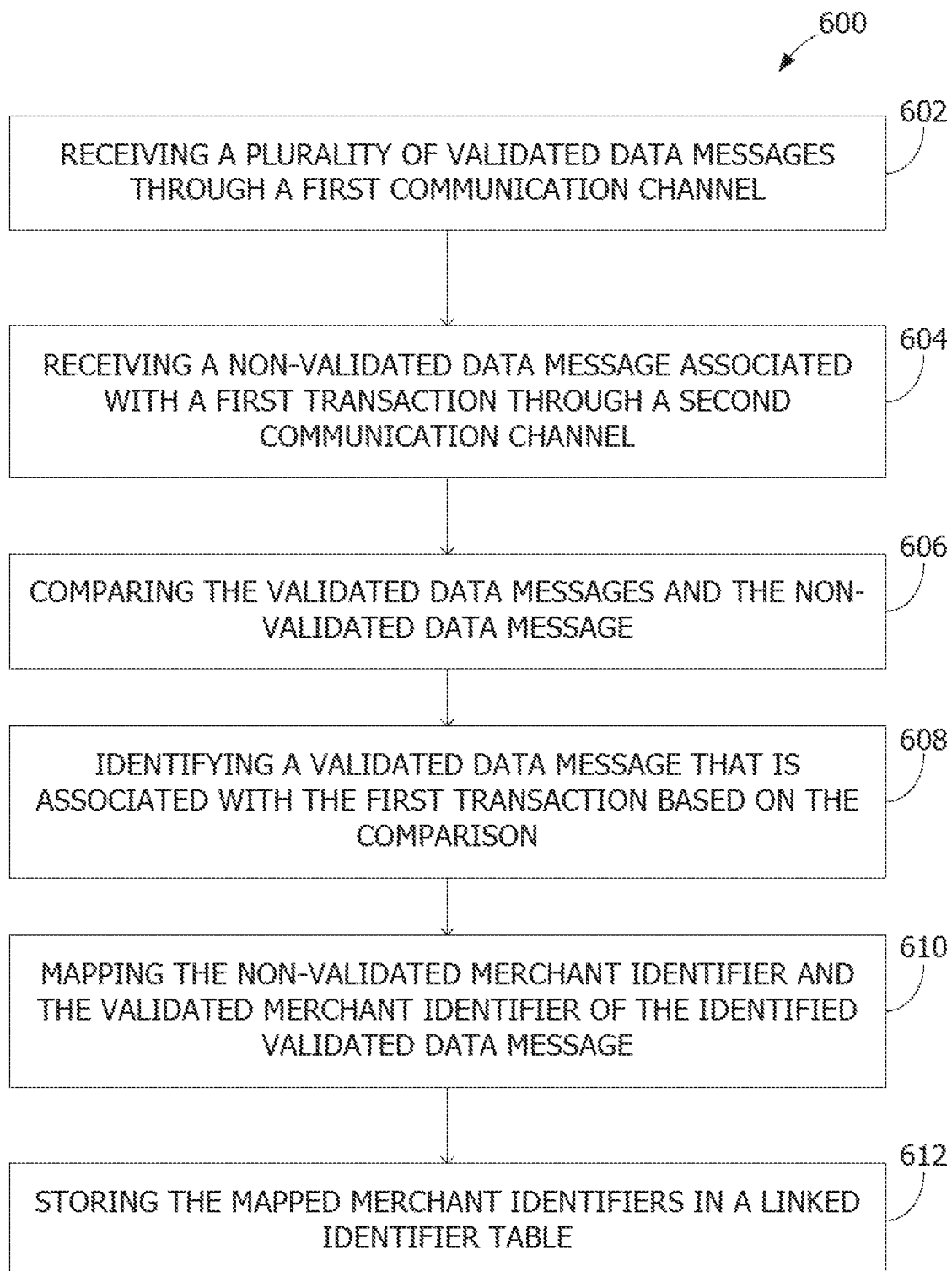

FIG. 6 is a flow diagram of an example method 600 for linking merchant identifiers to authorization content using an identifier mapping system, such as system 100 (shown in FIG. 1). In the example embodiment, method 600 is performed by a DM computing device. In certain embodiments, method 600 may be at least partially performed by a different computing device. In other embodiments, method 600 may include additional, fewer, or alternative actions, including those described elsewhere herein.

Method 600 begins with the DM computing device receiving 602 a plurality of validated data messages associated with a plurality of transactions through a first communication channel. Each validated data message includes a plurality of validated data elements with a validated merchant identifier. The DM computing device also receives 604 a non-validated data message associated with a first transaction through a second communication channel. The non-validated data message includes a plurality of non-validated data elements with a non-validated merchant identifier. In some embodiments, the non-validated data message includes one or more partial data elements, such as a partial PAN.

The DM computing device compares 606 the validated data messages and the non-validated data message and identifies 608 a validated data message that is associated with the first transaction based on the comparison 606. More specifically, the DM computing device compares non-validated data elements of the non-validated data message to the validated data elements of each validated data message. If the non-validated data elements are substantially similar or match the validated data elements of a single validated data message, the non-validated message and the validated data message are definitively matched.

The DM computing device maps 610 the non-validated merchant identifier of the non-validated data message and the validated merchant identifier of the identified authorization message together by automatically generating or updating an entry of a linked identifier table of the DM computing device. The DM computing device stores 612 the mapped merchant identifiers in the linked identifier table with the generated or updated entry. Automating the identification and storing of mapped merchant identifiers enables the DM computing device to provide a dynamic mapping of linked merchant identifiers for subsequent user messages and authorization messages.

For example, if a subsequent non-validated message includes a non-validated merchant identifier that matches a mapped merchant identifier in the linked identifier table, the DM computing device may provide one or more mapped merchant identifiers associated with the non-validated merchant identifier to a payment processor to enable the payment processor to match the user message to an authorization message based on the provided merchant identifier.

Figure 7:
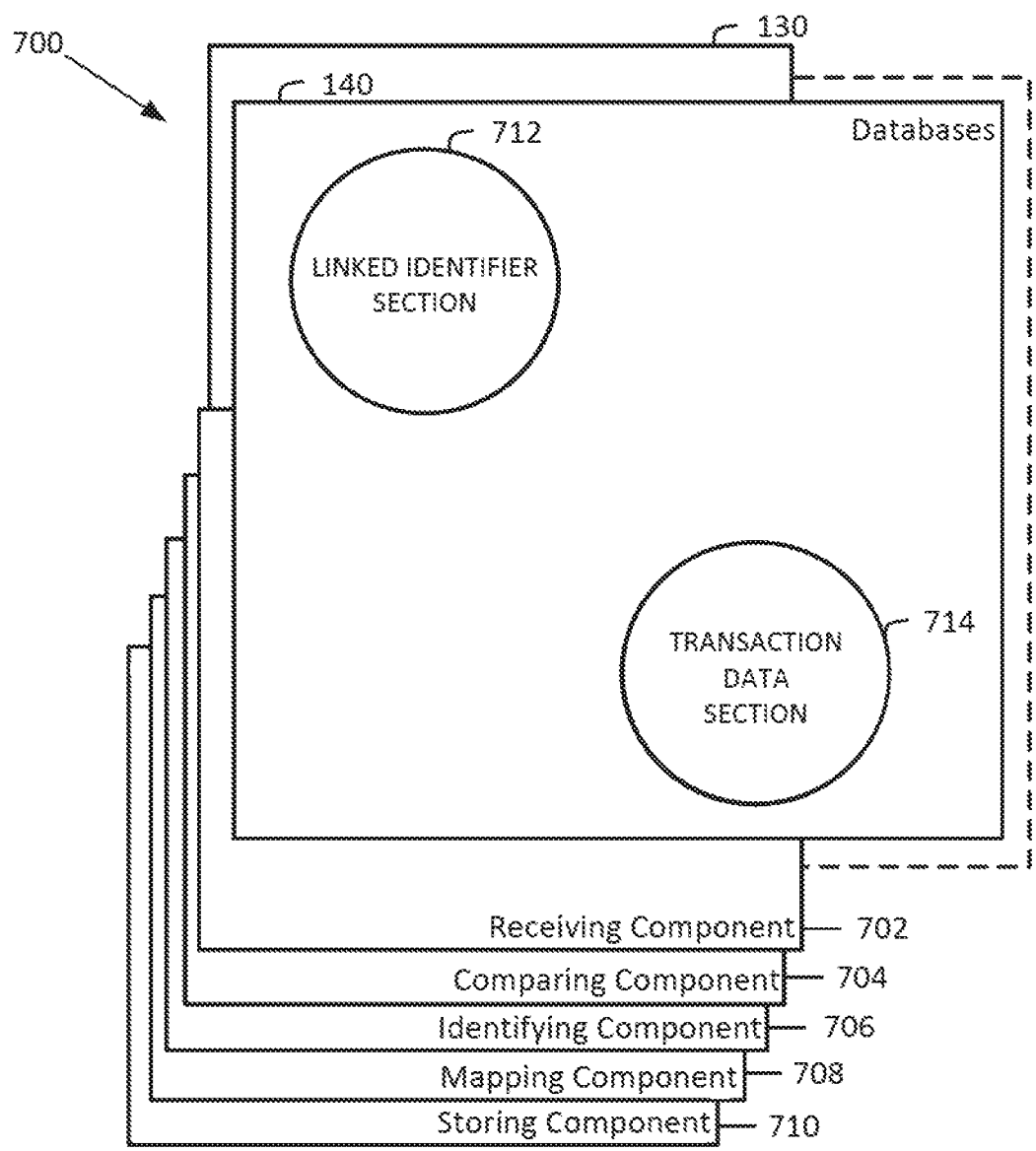

FIG. 7 is a diagram 700 of components of one or more example computing devices that may be used in the method shown in FIG. 6. FIG. 7 further shows a configuration of databases including at least database 140. Database 140 is coupled to several separate components within DM computing device 130, which perform specific tasks.

DM computing device 130 includes a receiving component 702 configured to receive one or more non-validated data messages and a plurality of validated data messages. DM computing device 130 further includes a comparing component 704 configured to compare the non-validated data messages and the validated data messages. DM computing device 130 additionally includes an identifying component 706 configured to identify validated data message that is associated with the same transaction as the non-validated data message based on the comparison. DM computing device 130 further includes a mapping component 708 configured to map merchant identifiers from the non-validated data message and the validated data message associated with the same transaction. DM computing device 130 also includes a storing component 710 configured to store the mapped merchant identifiers in a linked identifier table.

In an exemplary embodiment, database 140 is divided into a plurality of sections, including but not limited to, linked identifier section 712 and a transaction data section 714. These sections within database 140 are interconnected to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A data mapping (DM) computing device comprising a processor and a memory in communication with the processor, wherein the processor is programmed to:

receive a plurality of validated data messages associated with a plurality of transactions through a first communication channel including a payment processing interchange network, each validated data message of the plurality of validated data messages including a plurality of validated data elements, the plurality of validated data elements including a validated merchant identifier;

receive a non-validated data message associated with a first transaction through a second communication channel other than the payment processing interchange network, the non-validated data message including a plurality of non-validated data elements, the plurality of non-validated data elements including a non-validated merchant identifier;

compare the plurality of validated data messages and the non-validated data message;

identify a validated data message of the plurality of validated data messages that is associated with the first transaction based on the comparison;

map the non-validated merchant identifier and the validated merchant identifier of the identified validated data message;

store the mapped merchant identifiers in a linked identifier table within the memory;

receive, through the first communication channel, a plurality of authorization data messages associated with additional transactions in an ISO 8583-compliant message format,
wherein each of the plurality of authorization data messages includes the validated merchant identifier, a primary account number (PAN), and a plurality of other data elements including at least a transaction date, a transaction time, and a transaction amount, and
wherein a portion of the PAN on two or more of the plurality of authorization data messages is the same;

receive, through the second communication channel, a second non-validated data message in a format different from the ISO 8583-compliant message format, the second non-validated data message including the non-validated merchant identifier, a partial PAN, a confidence score for a subject transaction, and a second plurality of other data elements including at least a second transaction date, a second transaction time, and a second transaction amount, wherein the confidence score represents a level of confidence that the subject transaction is a non-fraudulent transaction;

perform a lookup in the linked identifier table using the non-validated merchant identifier to identify and retrieve the validated merchant identifier;

compare the partial PAN of the second non-validated data message to the PAN'S of the plurality of authorization data messages to identify the two or more of the plurality of authorization data messages potentially associated with the second non-validated data message;

compare the second plurality of other data elements to the plurality of other data elements in the two or more of the plurality of authorization data messages;

determine, based on the lookup, and based on the comparison of the other data elements, that the second non-validated data message is associated with one of the plurality of authorization data messages;

modify the second non-validated data message to include the validated merchant identifier; and transmit the one of the plurality of authorization data messages and second non-validated data message, both including the validated merchant identifier, to the payment processing interchange network through the first communication channel so that the confidence score can be utilized by an authorizing party when authorizing one of the additional transactions associated with the one of the plurality of authorization data messages.

2. The DM computing device in accordance with claim 1, wherein the processor is further programmed to:
compare the validated merchant identifier of the one of the plurality of authorization data messages to the linked identifier table;
identify a first mapped merchant identifier stored in the linked identifier table that matches the validated merchant identifier; and
retrieve a second mapped merchant identifier associated with the identified first mapped merchant identifier from the linked identifier table.

3. The DM computing device in accordance with claim 2, wherein the processor is further programmed to:
compare the second non-validated data message to the one of the plurality of authorization data messages; and
determine that the second non-validated data message is associated with one of the plurality of authorization data messages based, at least in part, on the non-validated merchant identifier of the second non-validated data message matching the retrieved second mapped merchant identifier.

4. The DM computing device in accordance with claim 1, wherein the processor is further programmed to:
compare the non-validated merchant identifier of the second non-validated data message to the linked identifier table;
identify a first mapped merchant identifier stored in the linked identifier table that matches the non-validated merchant identifier; and
retrieve a second mapped merchant identifier associated with the identified first mapped merchant identifier from the linked identifier table, the second mapped merchant identifier including the validated merchant identifier.

5. The DM computing device in accordance with claim 4, wherein the processor is further programmed to:
compare the one of the plurality of authorization data messages to the second non-validated data message; and
determine the one of the plurality of authorization data messages is associated with the second non-validated data message based, at least in part, on the validated merchant identifier of the one of the plurality of authorization data messages matching the retrieved second mapped merchant identifier.

6. A method for linking non-validated data to validated data, the method comprising:
receiving, by a data mapping (DM) computing device, a plurality of validated data messages associated with a plurality of transactions through a first communication channel including a payment processing interchange network, each validated data message of the plurality of validated data messages including a plurality of validated data elements, the plurality of validated data elements including a validated merchant identifier;
receiving a non-validated data message associated with a first transaction through a second communication channel other than the payment processing interchange network, the non-validated data message including a plurality of non-validated data elements, the plurality of non-validated data elements including a non-validated merchant identifier;
comparing, by the DM computing device, the plurality of validated data messages and the non-validated data message;

identifying a validated data message of the plurality of validated data messages that is associated with the first transaction based on the comparison;

mapping, by the DM computing device, the non-validated merchant identifier and the validated merchant identifier of the identified validated data message;

storing the mapped merchant identifiers in a linked identifier table;

receiving, through the first communication channel, a plurality of authorization data messages associated with additional transactions in an ISO 8583-compliant message format, wherein each of the plurality of authorization data messages includes the validated merchant identifier, a primary account number (PAN), and a plurality of other data elements including at least a transaction date, a transaction time, and a transaction amount, and wherein a portion of the PAN on two or more of the plurality of authorization data messages is the same;

receiving, through the second communication channel, a second non-validated data message in a format different from the ISO 8583-compliant message format, the second non-validated data message including the non-validated merchant identifier, a partial PAN, a confidence score for a subject transaction, and a second plurality of other data elements including at least a second transaction date, a second transaction time, and a second transaction amount, wherein the confidence score represents a level of confidence that the subject transaction is a non-fraudulent transaction;

performing a lookup in the linked identifier table using the non-validated merchant identifier to identify and retrieve the validated merchant identifier;

comparing the partial PAN of the second non-validated data message to the PAN'S of the plurality of authorization data messages to identify the two or more of the plurality of authorization data messages potentially associated with the second non-validated data message;

comparing the second plurality of other data elements to the plurality of other data elements in the two or more of the plurality of authorization data messages;

determining, based on the lookup, and based on the comparison of the other data elements, that the second non-validated data message is associated with one of the plurality of authorization data messages;

modifying the second non-validated data message to include the validated merchant identifier; and transmitting the one of the plurality of authorization data messages and second non-validated data message, both including the validated merchant identifier, to the payment processing interchange network through the first communication channel so that the confidence score can be utilized by an authorizing party when authorizing one of the additional transactions associated with the one of the plurality of authorization data messages.

7. The method in accordance with claim 6 further comprising:

comparing the validated merchant identifier of the one of the plurality of authorization data messages to the linked identifier table;

identifying a first mapped merchant identifier stored in the linked identifier table that matches the validated merchant identifier; and retrieving, by the DM computing device, a second mapped merchant identifier associated with the identified first mapped merchant identifier from the linked identifier table.

8. The method in accordance with claim 7 further comprising:

comparing the second non-validated data message to the one of the plurality of authorization data messages; and determining, by the DM computing device, that the second non-validated data message is associated with the one of the plurality of authorization data messages based, at least in part, on the non-validated merchant identifier of the second non-validated data message matching the retrieved second mapped merchant identifier.

9. The method in accordance with claim 6 further comprising:

comparing the non-validated merchant identifier of the second non-validated data message to the linked identifier table;

identifying, by the DM computing device, a first mapped merchant identifier stored in the linked identifier table that matches the non-validated merchant identifier; and retrieving, by the DM computing device, a second mapped merchant identifier associated with the identified first mapped merchant identifier from the linked identifier table, the second mapped merchant identifier including the validated merchant identifier.

10. The method in accordance with claim 9 further comprising:

comparing the one of the plurality of authorization data messages to the second non-validated data message; and determining the one of the plurality of authorization data messages is associated with the second non-validated data message based, at least in part, on the validated merchant identifier of the one of the plurality of authorization data messages matching the retrieved second mapped merchant identifier.

11. At least one non-transitory computer-readable storage media for linking non-validated data to validated data, the computer-readable storage media having computer-executable instructions embodied thereon, wherein, when executed by at least one processor, the computer-executable instructions cause the processor to:

receive a plurality of validated data messages associated with a plurality of transactions through a first communication channel including a payment processing interchange network, each validated data message of the plurality of validated data messages including a plurality of validated data elements, the plurality of validated data elements including a validated merchant identifier;

receive a non-validated data message associated with a first transaction through a second communication channel other than the payment processing interchange network, the non-validated data message including a plurality of non-validated data elements, the plurality of non-validated data elements including a non-validated merchant identifier;

compare the plurality of validated data messages and the non-validated data message;

identify a validated data message of the plurality of validated data messages that is associated with the first transaction based on the comparison;

map the non-validated merchant identifier and the validated merchant identifier of the identified validated data message;
store the mapped merchant identifiers in a linked identifier table within the memory;
receive, through the first communication channel, a plurality of authorization data messages associated with additional transactions in an ISO 8583-compliant message format,
  wherein each of the plurality of authorization data messages includes the validated merchant identifier, a primary account number (PAN), and a plurality of other data elements including at least a transaction date, a transaction time, and a transaction amount, and
  wherein a portion of the PAN on two or more of the plurality of authorization data messages is the same;
receive, through the second communication channel, a second non-validated data message in a format different from the ISO 8583-compliant message format, the second non-validated data message including the non-validated merchant identifier, a partial PAN, a confidence score for a subject transaction, and a second plurality of other data elements including at least a second transaction date, a second transaction time, and a second transaction amount, wherein the confidence score represents a level of confidence that the subject transaction is a non-fraudulent transaction;
perform a lookup in the linked identifier table using the non-validated merchant identifier to identify and retrieve the validated merchant identifier;
compare the partial PAN of the second non-validated data message to the PAN'S of the plurality of authorization data messages to identify the two or more of the plurality of authorization data messages potentially associated with the second non-validated data message;
compare the second plurality of other data elements to the plurality of other data elements in the two or more of the plurality of authorization data messages;
determine, based on the lookup, and based on the comparison of the other data elements, that the second non-validated data message is associated with one of the plurality of authorization data messages;
modify the second non-validated data message to include the validated merchant identifier; and
transmit the one of the plurality of authorization data messages and second non-validated data message, both including the validated merchant identifier, to the payment processing interchange network through the first communication channel so that the confidence score can be utilized by an authorizing party when authorizing one of the additional transactions associated with the one of the plurality of authorization data messages.

12. The non-transitory computer-readable storage media in accordance with claim 11, wherein the computer-executable instructions further cause the processor to:
  compare the validated merchant identifier of the one of the plurality of authorization data messages to the linked identifier table;
  identify a first mapped merchant identifier stored in the linked identifier table that matches the validated merchant identifier; and
  retrieve a second mapped merchant identifier associated with the identified first mapped merchant identifier from the linked identifier table.

13. The non-transitory computer-readable storage media in accordance with claim 12, wherein the computer-executable instructions further cause the processor to:
  compare the second non-validated data message to the one of the plurality of authorization data messages; and
  determine that the second non-validated data message is associated with the one of the plurality of authorization data messages based, at least in part, on the non-validated merchant identifier of the second non-validated data message matching the retrieved second mapped merchant identifier.

14. The non-transitory computer-readable storage media in accordance with claim 11, wherein the computer-executable instructions further cause the processor to:
  compare the non-validated merchant identifier of the second non-validated data message to the linked identifier table;
  identify a first mapped merchant identifier stored in the linked identifier table that matches the non-validated merchant identifier; and
  retrieve a second mapped merchant identifier associated with the identified first mapped merchant identifier from the linked identifier table, the second mapped merchant identifier including the validated merchant identifier.

15. The non-transitory computer-readable storage media in accordance with claim 14, wherein the computer-executable instructions further cause the processor to:
  compare the one of the plurality of authorization data messages to the second non-validated data message; and
  determine the one of the plurality of authorization data messages is associated with the second non-validated data message based, at least in part, on the validated merchant identifier of the one of the plurality of authorization data messages matching the retrieved second mapped merchant identifier.

* * * * *